(12) United States Patent
Yoo et al.

(10) Patent No.: US 10,461,678 B2
(45) Date of Patent: Oct. 29, 2019

(54) METHODS AND SYSTEMS FOR DETERMINING WHEN TO APPLY AN ADAPTATIVE THERMAL COMPENSATION IN AN OPERATING REGION OF A MOTOR

(71) Applicant: GM GLOBAL TECHNOLOGY OPERATIONS LLC, Detroit, MI (US)

(72) Inventors: Anno Yoo, Rochester, MI (US); Siddharth Ballal, Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/924,823

(22) Filed: Mar. 19, 2018

(65) Prior Publication Data

US 2019/0288625 A1 Sep. 19, 2019

(51) Int. Cl.
*H02P 21/00* (2016.01)
*H02P 21/16* (2016.01)
*B60L 15/20* (2006.01)

(52) U.S. Cl.
CPC .......... *H02P 21/0085* (2013.01); *B60L 15/20* (2013.01); *H02P 21/16* (2016.02); *B60L 2240/36* (2013.01); *H02P 2205/05* (2013.01)

(58) Field of Classification Search
CPC ...... H02P 21/22; H02P 21/0089; H02P 27/08; H02P 21/06; H02P 2207/05
See application file for complete search history.

(56) References Cited

U.S. PATENT DOCUMENTS

2016/0114801 A1* 4/2016 Park ...................... B60W 30/18
701/22
2018/0062547 A1* 3/2018 Dutta ........................ H02P 6/04

* cited by examiner

*Primary Examiner* — Bickey Dhakal
*Assistant Examiner* — Zoheb S Imtiaz
(74) *Attorney, Agent, or Firm* — Lorenz & Kopf, LLP

(57) ABSTRACT

Methods and systems for applying adaptive thermal compensation when operating a rotor of a motor are provided. The method includes: receiving a plurality of parameter data of torque and temperature of the rotor and current and voltage of the motor by a region determination module; calculating, by the region determination module from the set of parameter data, a cosine value to determine a region for applying the adaptive thermal compensation wherein the cosine value is calculated from a constant torque direction vector and a voltage limit eclipse vector derived from a functional relationship of the one or more parameter data; and applying, by a reference modification module, a modification value to incrementally modify the motor current when the motor is operating within the region determined by the region determination module for the adaptive thermal compensation.

16 Claims, 6 Drawing Sheets

METHODS AND SYSTEMS FOR DETERMINING WHEN TO APPLY AN ADAPTATIVE THERMAL COMPENSATION IN AN OPERATING REGION OF A MOTOR

TECHNICAL FIELD

The technical field generally relates to an operating region of a rotor of a synchronous motor, and more particularly relates to methods and systems to determine when to apply a thermal adaptive compensation in an operating region under varying rotor temperatures and angular speed to improve torque control performance.

INTRODUCTION

The propulsion system in an electric vehicle includes a permanent magnet synchronous motor that may operate in a torque control mode and includes a rotor portion containing a permanent magnet and a stator. The strength of the rotor magnet flux determines the magnitude of magnet-produced torque. The magnet strength or torque produced by the motor may change due to a number of factors including variations in operating temperature of the rotor. For example, at higher angular speeds the rotor may not be operating optimally as decreases in magnet flux may occur in part due to the higher rotor temperatures.

Accordingly, it is desirable to monitor angular velocity and rotor temperature to determine in a region of operating a motor, an adaptive thermal compensation of a current reference modification can be applied to improve torque control of the rotor regardless of variations of a DC-link voltage received by the motor. Furthermore, other desirable features and characteristics of the present invention will become apparent from the subsequent detailed description and the appended claims, taken in conjunction with the accompanying drawings and the foregoing technical field and background.

SUMMARY

A method and system in a vehicle for determining when to apply an adaptive thermal compensation for an electric motor based on an operating region is disclosed.

In an embodiment, a method for applying adaptive thermal compensation when operating a rotor of a motor is provided. The method includes: receiving a plurality of parameter data of torque and temperature of the rotor and current and voltage of the motor by a region determination module, the set of parameter data includes: a reference torque of the rotor, a current measurement of the current of the motor, a measured voltage of the motor, an angular speed measured of the rotor, and an estimated temperature of the rotor; calculating, by the region determination module from the set of parameter data, a cosine value to determine a region for applying the adaptive thermal compensation wherein the cosine value is calculated from a constant torque direction vector and a voltage limit eclipse vector derived from a functional relationship of the one or more parameter data; and applying, by a reference modification module, a modification value to incrementally modify the motor current when the motor is operating within the region determined by the region determination module for the adaptive thermal compensation.

The method further includes: deriving the constant torque direction vector based on the measured angular speed of the rotor wherein the constant torque direction vector is calculated by a function $$M \triangleq \left(-\frac{\partial T_e}{\partial i^e_{qs}}, \frac{\partial T_e}{\partial i^e_{ds}}\right)$$

wherein $T_e$ is an electromagnetic torque and $i^e_{ds}$ and $i^e_{qs}$ are a d- and q-axis dq current in a synchronously rotating reference frame of the motor.

The method further includes: deriving the voltage limit eclipse vector based on a d-axis current and a q-axis current of the measurement of the current of the motor wherein the voltage limit eclipse vector by the function $$N \triangleq \left(-\frac{\partial J}{\partial i^e_{ds}}, -\frac{\partial J}{\partial i^e_{qs}}\right)$$

wherein $$J = \frac{1}{2}\left(v^{e2}_{ds} + v^{e2}_{qs}\right), v^e_{ds} \cong -\omega_r \lambda^e_{qs} = -\omega_r L_q i^e_{qs}$$

and $v^e_{qs} \cong \omega_r \lambda^e_{ds} = \omega_r(L_d i^e_{ds} + \lambda_f)$ wherein $\lambda^e_{ds}$ and $\lambda^e_{qs}$ are estimated dq flux linkages in the synchronously rotating reference frame, $\omega_r$ is the rotor angular speed, $i^e_{ds}$ and $i^e_{qs}$ are the d-axis and q-axis dq currents in the synchronously rotating reference frame, $v^e_{ds}$ and $v^e_{qs}$ are voltages in the synchronously rotating reference frame, $L_d$ and $L_q$ are d-axis and q-axis inductances, and L matrix is a gain.

The method further includes: calculating the cosine value by calculating the inner product of $$\frac{1}{\|M\|}\left(-\frac{\partial T_e}{\partial i^e_{qs}}, \frac{\delta \partial}{\partial i^e_{ds}}\right) \cdot \frac{1}{\|N\|}\left(-\frac{\partial J}{\partial i^e_{ds}}, -\frac{\partial J}{\partial i^e_{qs}}\right) = 1 * 1 * \cos\theta$$

wherein $T_e$ is an electromagnetic torque calculated by the function $$T_e = \frac{3}{2}\frac{P}{2}((L_d - L_q)i^e_{ds} + \lambda_f)i^e_{qs}$$

wherein $i^e_{ds}$ and $i^e_{qs}$ are the d-axis and the q-axis dq current in the synchronously rotating reference frame of the motor wherein $\|x\|$ is a magnitude of vector and $L_d$ and $L_q$ are d-axis and q-axis inductances.

The method further includes: applying a first threshold and second torque threshold for determining the region for thermal adaptation wherein second torque threshold is greater than the first torque threshold wherein a d-axis current compensation is applied when the torque is above the second torque threshold.

The gradient descent compensation is applied when the torque is between the first torque threshold and the second torque threshold. No compensation is applied when the torque is below the first torque threshold. The adaptive thermal compensation includes: a d-axis current compensation, and a gradient descent compensation for achieving an optimal operating point when operating the motor.

In another embodiment, a system is provided. The system includes: an adaptive thermal compensation determination module includes: one or more processors configured by programming instructions encoded on non-transient computer readable media, the adaptive thermal compensation determination module configured to: receive a plurality of parameter data of torque and temperature of the rotor and current and voltage wherein the set of parameter data includes: an estimated reference torque of the rotor, a current measurement of the current of the motor, a measured voltage of the motor, an angular speed measured of the rotor, and an estimated temperature of the rotor; calculate, from the set of parameter data, a cosine value to determine a region for applying the adaptive thermal compensation wherein the cosine value is calculated from a constant torque direction vector and a voltage limit eclipse vector derived from a functional relationship of the one or more parameter data; and apply a modification value to incrementally modify the motor current when the motor is operating within the region determined by the region determination module for the adaptive thermal compensation.

The adaptive thermal compensation determination module is configured to: derive the constant torque direction vector based on a measured or an estimated angular speed of the rotor. The adaptive thermal compensation determination module is configured to: derive the voltage limit eclipse vector based on a d-axis and a q-axis of the measurement of the current of the motor.

The adaptive thermal compensation determination module is configured to: apply a first threshold and second torque threshold for determining the region for thermal adaptation wherein second torque threshold is greater than the first torque threshold wherein a d-axis current compensation is applied when the torque is above the second torque threshold. The adaptive thermal compensation determination module is configured to: apply a gradient descent compensation when the torque is between the first torque threshold and the second torque threshold. The adaptive thermal compensation determination module is configured to: apply no compensation when the torque is below the first torque threshold. The adaptive thermal compensation determination module is configured in sub-modules of a region determination module and a reference modification module. The adaptive thermal compensation includes: a d-axis current compensation, and a gradient descent compensation for achieving an optimal operating point when operating the motor.

In yet another embodiment, a vehicle is provided. The vehicle includes: an electric permanent magnet motor and a region determination module includes: one or more processors and non-transient computer readable media encoded with programming instructions, the region determination module is configured to: receive a plurality of parameter data of torque and temperature of the rotor and current and voltage wherein the set of parameter data includes: a reference torque of the rotor, a current measurement of the current of the motor, a measured voltage of the motor, an angular speed measured of the rotor, and an estimated temperature of the rotor; calculate, from the set of parameter data, a cosine value to determine a region for applying adaptive thermal compensation wherein the cosine value is calculated from a constant torque direction vector and a voltage limit eclipse vector derived from a functional relationship of the one or more parameter data; and apply a modification value to incrementally modify the motor current when the motor is operating within the region determined by the region determination module for the adaptive thermal compensation.

The adaptive thermal compensation includes: a d-axis current compensation, and a gradient descent compensation for achieving an optimal operating point when operating the motor. The region determination module is configured in sub-modules of a determination module and a reference modification module.

The region determination module is configured to: derive an electromagnetic torque based on the function $$T_e = \frac{3}{2}\frac{P}{2}((L_d - L_q)i_{ds}^e + \lambda_f)i_{qs}^e$$

wherein $L_d$ and $L_q$ are d-axis and q-axis inductances.

This summary is provided to describe select concepts in a simplified form that are further described in the Detailed Description.

This summary is not intended to identify key or essential features of the claimed subject matter, nor is it intended to be used as an aid in determining the scope of the claimed subject matter.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, summary, or the following detailed description.

As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

The subject matter described herein discloses apparatus, systems, techniques and articles for applying adaptive thermal compensation based on operating regions of the synchronous magnetic motor. The described techniques provide a method for monitoring/determining values of temperature and angular velocity in a permanent magnet motor to determine an operating region applicable for adaptive thermal compensation.

Figure 1:
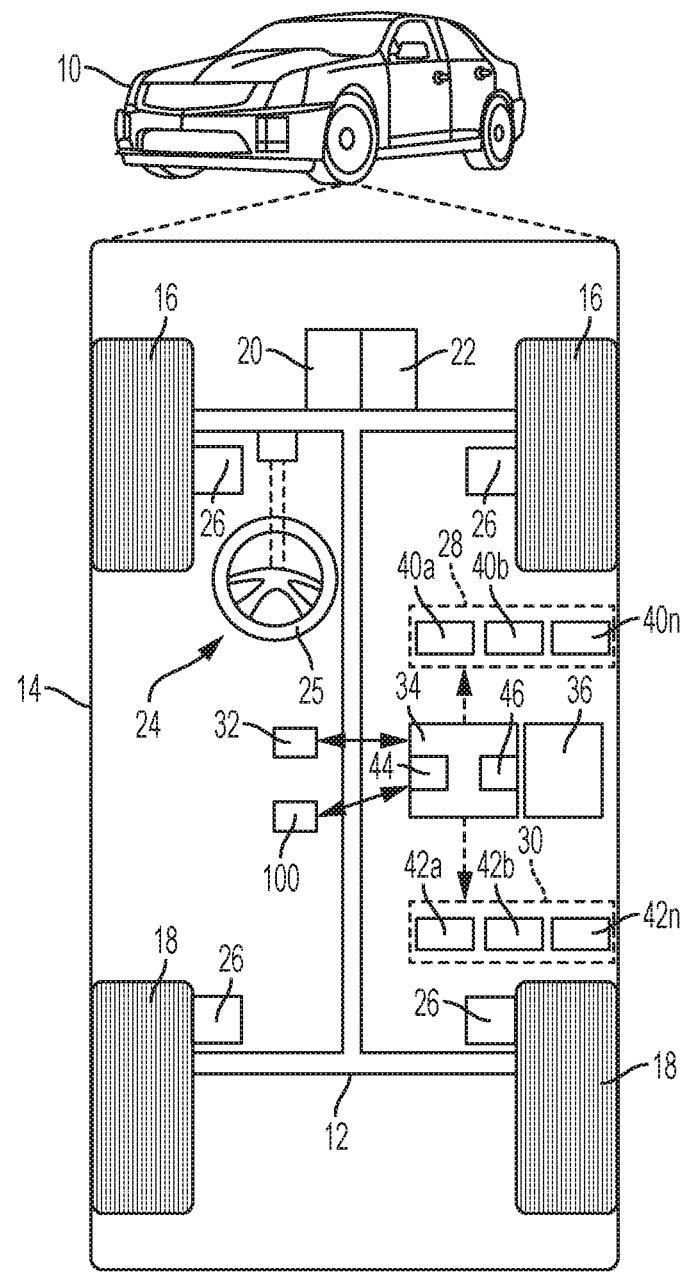
FIG. 1 is a block diagram depicting an example vehicle that may include an adaptive thermal compensation for rotor control system, in accordance with an embodiment.

FIG. 1 is a block diagram depicting an example vehicle that may include an adaptive thermal compensation system 100 based on operating regions of the synchronous magnetic motor. In general, the adaptive thermal compensation system (or simply "system") 100 determines the compensation region based on a calculated cosine value by calculating a product of a calculated constant torque vector and a calculated voltage limit ellipse vector related to current vector currents of the rotor.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The vehicle wheels 16-18 are each rotationally coupled to the chassis 12 near a respective corner of the body 14. The vehicle 10 is depicted in the illustrated embodiment as a passenger car, but it should be appreciated that any other vehicle, including motorcycles, trucks, sport utility vehicles (SUVs), recreational vehicles (RVs), marine vessels, aircraft, etc., can also be used.

As shown, the vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in this example, includes an electric machine such as a permanent magnet (PM) motor. The transmission system 22 is configured to transmit power from the propulsion system 20 to the vehicle wheels 16 and 18 according to selectable speed ratios.

The brake system 26 is configured to provide braking torque to the vehicle wheels 16 and 18. Brake system 26 may, in various embodiments, include friction brakes, brake by wire, a regenerative braking system such as an electric machine, and/or other appropriate braking systems.

The steering system 24 influences a position of the vehicle wheels 16 and/or 18. While depicted as including a steering wheel 25 for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the vehicle 10 and generate sensor data relating thereto.

The actuator system 30 includes one or more actuator devices 42a-42n that control one or more vehicle features such as, but not limited to, the propulsion system 20, the transmission system 22, the steering system 24, and the brake system 26. In various embodiments, the vehicle 10 may also include interior and/or exterior vehicle features not illustrated in FIG. 1, such as various doors, a trunk, and cabin features such as air, music, lighting, touch-screen display components, and the like.

The data storage device 32 stores data for use in controlling the vehicle 10. The data storage device 32 may be part of the controller 34, separate from the controller 34, or part of the controller 34 and part of a separate system.

The controller 34 includes at least one processor 44 (integrate with system 100 or connected to the system 100) and a computer-readable storage device or media 46. The processor 44 may be any custom-made or commercially available processor, a central processing unit (CPU), a graphics processing unit (GPU), an application specific integrated circuit (ASIC) (e.g., a custom ASIC implementing a neural network), a field programmable gate array (FPGA), an auxiliary processor among several processors associated with the controller 34, a semiconductor-based microprocessor (in the form of a microchip or chip set), any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10. In various embodiments, controller 34 is configured to implement a lane change speed management system as discussed in detail below.

The instructions may include one or more separate programs, each of which includes an ordered listing of executable instructions for implementing logical functions. The instructions, when executed by the processor 44, receive and process signals (e.g., sensor data) from the sensor system 28, perform logic, calculations, methods and/or algorithms for automatically controlling the components of the vehicle 10, and generate control signals that are transmitted to the actuator system 30 to automatically control the components of the vehicle 10 based on the logic, calculations, methods, and/or algorithms. Although only one controller 34 is shown in FIG. 1, embodiments of the vehicle 10 may include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

As an example, the system 100 may include any number of additional sub-modules embedded within the controller 34 which may be combined and/or further partitioned to similarly implement systems and methods described herein. Additionally, inputs to the system 100 may be received from the sensor system 28, received from other control modules (not shown) associated with the vehicle 10, and/or determined/modeled by other sub-modules (not shown) within the controller 34 of FIG. 1. Furthermore, the inputs might also be subjected to preprocessing, such as sub-sampling, noise-reduction, normalization, feature-extraction, missing data reduction, and the like.

Figure 2:
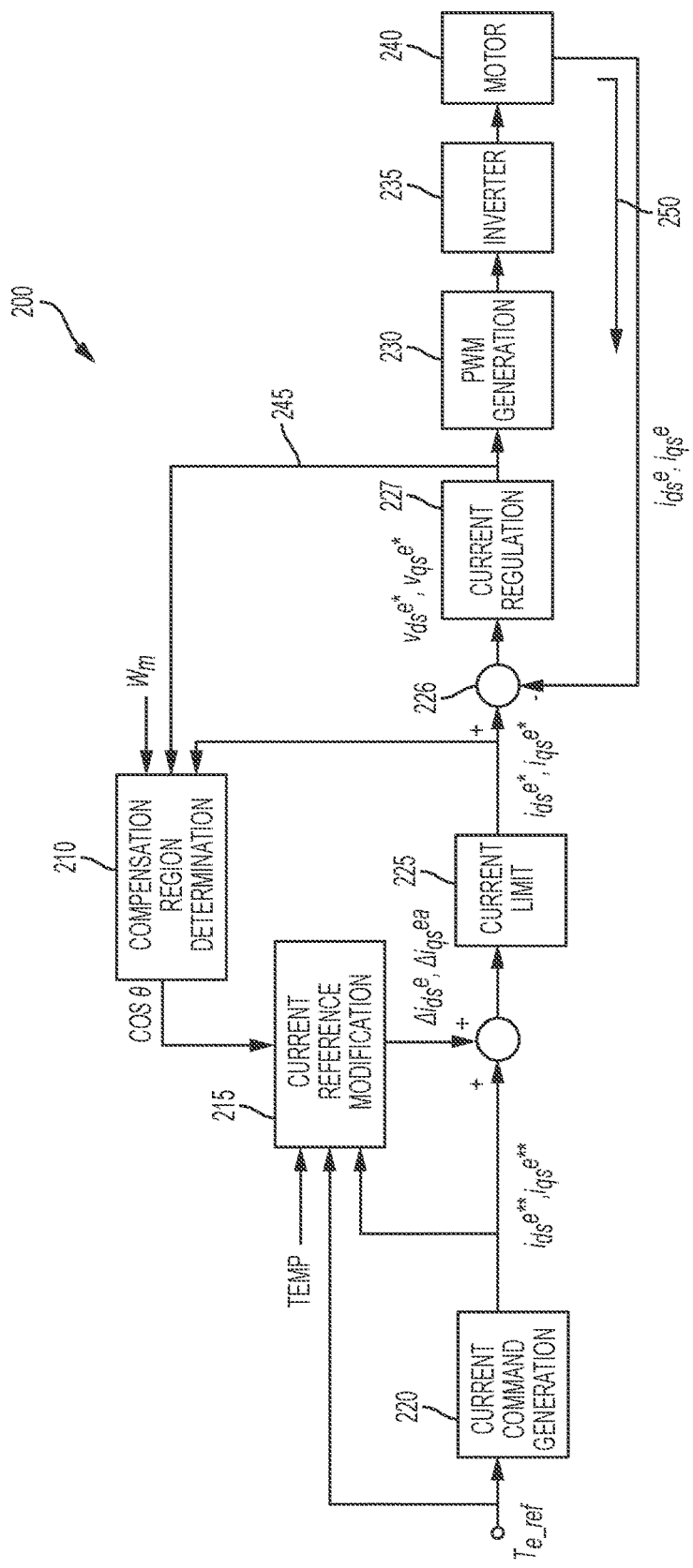
FIG. 2 is a block diagram of the adaptive thermal compensation system based on operating regions of the synchronous magnetic motor, in accordance with an embodiment.

FIG. 2 is a block diagram of the adaptive thermal compensation system based on operating regions of the synchronous magnetic motor, in accordance with an embodiment. The example adaptive thermal compensation system 200 includes a compensation region determination module 210 coupled to a current reference modification module 215. The compensation region determination module 210 is configured to determine a compensation region by calculating an inner product of a constant torque direction unit vector and a voltage limit ellipse vector in which the direction is toward a center of voltage limit ellipse and has a unity magnitude. The inner product of the two unit vectors populates the cosine value and the compensation region is determined by the cosine value regardless DC-link voltage. The current reference modification module 215 receives inputs of temperature variations or estimated temperature values with are functionally related to the magnetic flux variations. The current reference modification module 215 calculates $\Delta i_{ds}^e$ and $\Delta i_{qs}^e$ as a function of the inputs of temperature, torque command and cos θ value. The compensation region determination module 210 determines the compensation region by first determining the cos θ value which in turn is used to determine whether the rotor in operating in a region applicable for adaptive thermal compensation or is directionally moving from the current region to an applicable region to execute thermal adaptive compensation operation.

The current command generation module 220 is a closed loop process that receives as input an initial torque of a reference value $T_{e\_ref}$ which in turn is used to generate a d- and a q-axis (dq) current value in a synchronously rotating reference frame having $i_{ds}^{e}$ and $i_{qs}^{e}$ dq current values (e.g., reference current or measured current values) which are sent to a current reference modification module 215. In addition, the current reference modification module receives a current temperature or determined estimated value (or possibly a stator temperature) of the rotor as well as the initial torque reference value $T_{e\_ref}$. The current reference modification module 215 calculates a change or an incremental change of the d-axis and q-axis (dq) currents of $\Delta i_{ds}^e$ and $\Delta i_{qs}^e$ in order to modify (i.e to add, subtract, and so on) the current measurement values $i_{ds}^{e}$ and $i_{qs}^{e}$ in order to send to the current limit module 225.

The current limit module 225 generates the d-axis and q-axis (dq) currents within prescribed threshold limits of $i_{ds}^{e}$ and $i_{qs}^{e}$ to send to the current regulation module 227. The subtractor block 226 determines the current error between the d-axis and q-axis current commands (from 225) and the measured currents via feedback 250. The current regulation module 227 receives the current error from 226 and calculates the voltage commands $V_{ds}^{e*}$ and $V_{qs}^{e*}$ for sending via feedback loop 245 to the compensation determination module 210 and to PWM generation module 230. The PWM generation module 230 generates the duty cycles used to drive gate drive circuits (not shown) of the inverter 235 that energizes the phases of the motor 240. That is, the current regulation module 227 regulates the voltage to $V_{ds}^{e*}$ and $V_{qs}^{e*}$ for sending via a feedback loop 245 to the compensation region determination module 210 and to the PWM generation module 230. The PWM generation module 230 controls or modulates the amount of torque applied to the inverter/motor module 235. The current measured values of the $i_{ds}^e$ and $i_{qs}^e$ currents are sent via feedback 250 from the inverter/motor module 235 for modifying the current amounts (ensuring below a particular threshold level of the current limit) within the prescribed current limit values. The compensation region determination module 210 receives the current torque value $W_m$ of the motor, the regulated voltage values $V_{ds}^{e*}$ and $V_{qs}^{e*}$ and the current values $i_{ds}^{e*}$ and $i_{qs}^{e*}$ to determine the compensation region based on a calculated cos θ value.

Figure 3:
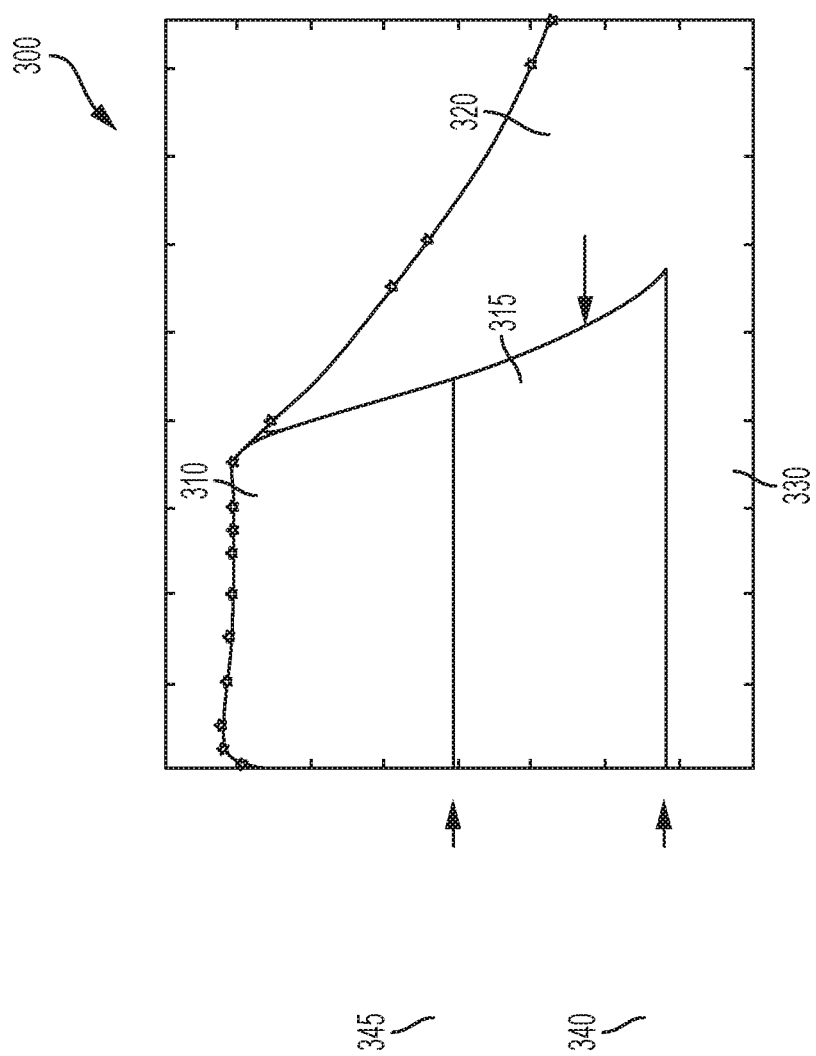
FIG. 3 is a graph depicting regions of operation of the adaptive thermal compensation system of the synchronous magnetic motor, in accordance with an embodiment.

FIG. 3 illustrates a graph of the adaptive thermal compensation applied in various operating regions based on the reference torque of the motor. The d-axis current compensation provided by the adaptive thermal compensation system is in a region of a measured torque above a torque threshold level 2 at 345. That is, above torque threshold 2 at 345 and the value of cos θ greater than a cosine threshold (region to left of 320). The d-axis current compensation is provided as a result by the higher torque threshold level 2 at 345 when the motor is operating at a higher angular speed. The gradient descent compensation is provided between threshold 1 and 2 and the value of cos θ greater than a cosine threshold (region to left of 320). That is, at 315 for an operating region of a measured torque between a torque threshold level 1 at 340 and torque threshold level 2 at 345 when the motor is operating at a lesser angular speed. The value of cos θ at 320 is determined on-line by calculating an inner product of a constant torque direction unit vector and a voltage limit ellipse vector in which the direction is toward a center of voltage limit ellipse and has a unity magnitude. The calibrations of cos θ at 320 are determined on-line as a function of $V_{dc}$ and the temperature of the rotor. Below torque threshold level 1 or when the value of cos θ is below the cosine threshold (region to the right of 320), there is no compensation at 330 provided by the adaptive thermal compensation system. In an exemplary embodiment, the graph can be described as follows: If T_ref>Threshold 2 & cosine theta>Cosine Threshold {d-axis compensation} Else if (T_ref between Threshold 1 and Threshold 2) & cosine theta>Cosine Threshold {gradient descent method} Else { no compensation}.

Figure 4:
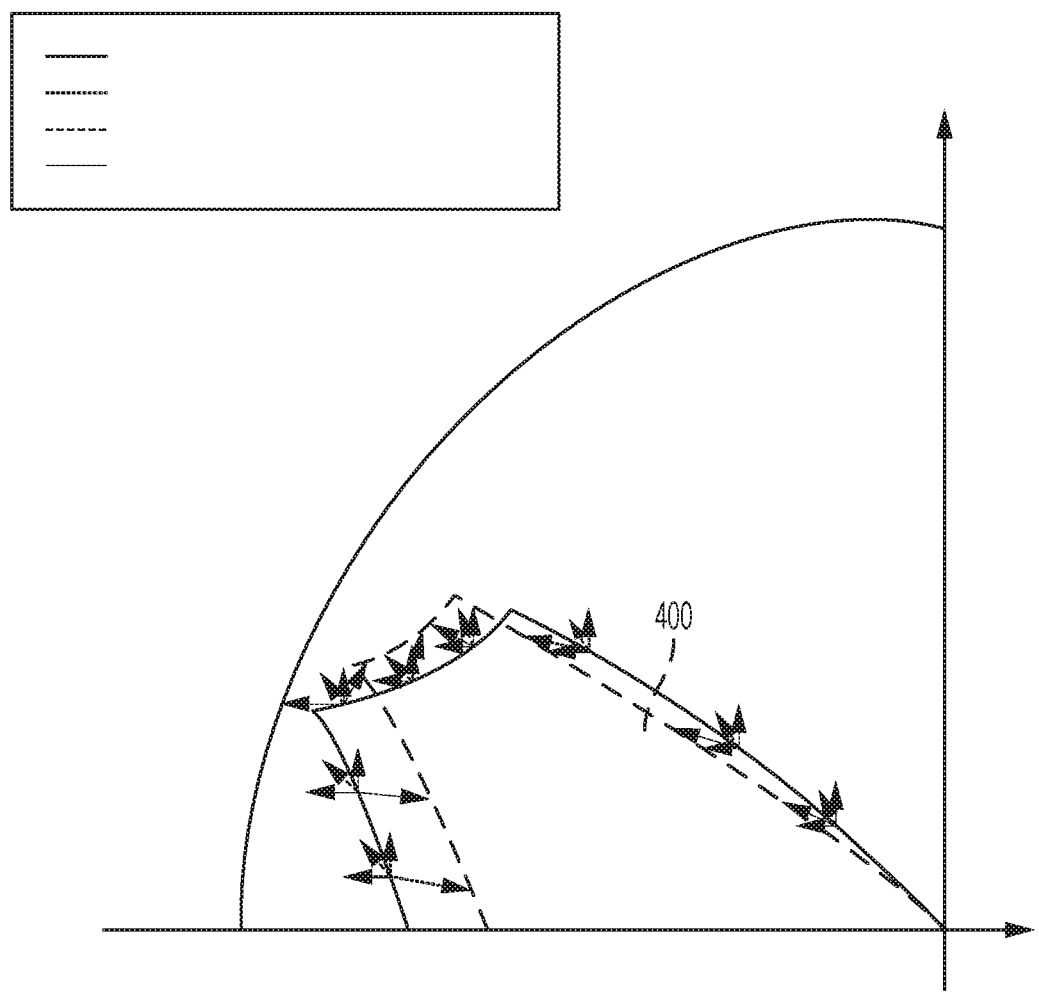
FIG. 4 is a graph depicting directional current vectors during operation of the adaptive thermal compensation system of the synchronous magnetic motor, in accordance with an embodiment.

FIG. 4 illustrates directional current vectors when the motor is operating at a higher angular velocity and are used to determine regions of adaptive thermal compensation for enabling optimal operating conditions of the motor. At a measured higher angular velocity or speed, the current modification is opposite to the optimal operating condition at lower angular speeds because the current reference modification only considers the generated torque based on the magnitude of the measured torque. The compensation direction of A, B, C, and D (illustrated on FIG. 4) current vectors are consistent in the direction of an optimal operating point for an optimal operating condition of the motor. However, the direction of the compensation of current vectors E, F, G, and H (illustrated on FIG. 4) is opposite to an optimal operating point which results in decreased flux and degrading of motor performance. The cos θ calculated value aids in determining the operating point when the direction of the operating point transitions between an optimal and non-optimal directions (i.e. between point D and point E) by proving directional information for current vectors to achieve the optimal operating point.

Figure 5A:
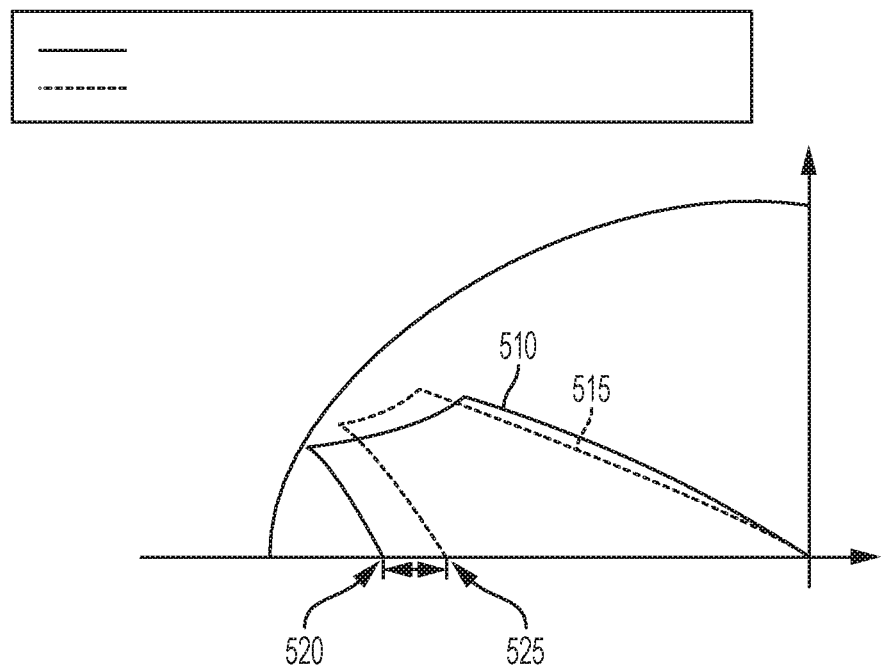
FIGS. 5A and 5B are graphs depicting regions for applying the adaptive thermal compensation system of the synchronous magnetic motor, in accordance with an embodiment.
Figure 5B:
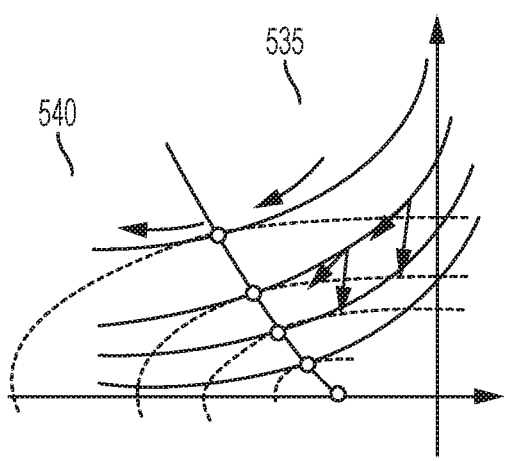

FIGS. 5A and 5B illustrate the performance of compensation region determination calculated by the compensation region module 210 (of FIG. 2). The adaptive thermal compensation region is determined based on calculations of an inner product between a constant torque direction unit vector and a voltage limit ellipse vector in which the direction is toward a center of voltage limit ellipse and the magnitude is of unity.

The motor or an electromagnetic torque or a measured torque is calculated by the equation of:

$$T_e = \frac{3}{2}\frac{P}{2}((L_d - L_q)i_{ds}^e + \lambda_f)i_{qs}^e.$$

The constant torque vector is calculated by the equation:

$$M \triangleq \left(-\frac{\partial T_e}{\partial i_{qs}^e}, \frac{\partial T_e}{\partial i_{ds}^e}\right)$$

and the voltage limit ellipse vector is calculated by the equation:

$$N \triangleq \left(-\frac{\partial J}{\partial i_{ds}^e}, -\frac{\partial J}{\partial i_{qs}^e}\right).$$

The average of the voltages in the reference frame based on the measured voltages of the motor, d-axis and q-axis dq currents and measured $\omega_r$ rotor angular speed with L matrix gains is calculated by the equations as follows:

$$J = \frac{1}{2}\left(v_{ds}^{e2} + v_{qs}^{e2}\right)$$

$$v_{ds}^e \cong -\omega_r \lambda_{qs}^e = -\omega_r L_q i_{qs}^e$$

$$v_{qs}^e \cong \omega_r \lambda_{ds}^e = \omega_r (L_d i_{ds}^e \lambda_f)$$

From these calculations which the inner product is derived and is calculated by the inner product equation:

$$\frac{1}{\|M\|}\left(-\frac{\partial T_e}{\partial i_{qs}^e}, \frac{\partial T_e}{\partial i_{ds}^e}\right) \cdot \frac{1}{\|N\|}\left(-\frac{\partial J}{\partial i_{ds}^e}, -\frac{\partial J}{\partial i_{qs}^e}\right) = 1 * 1 * \cos\theta.$$

The inner product of two unit vectors can populate the cosine value and the compensation region can be determined by the cosine value regardless of the DC-link voltage received by the motor.

The above symbols (e.g., e) represent an estimated/measured value, $\lambda_{ds}^r$ and $\lambda_{qs}^r$ are the dq flux linkages in the synchronously rotating reference frame, $\lambda_f$ is the magnet flux linkage, $\omega_r$ is the rotor angular speed, $T_e$ is the electromagnetic or motor torque, $i_{ds}^e$ and $i_{qs}^e$ are the d-axis and q-axis dq currents in the synchronously rotating reference frame, $v_{ds}^r$ and $v_{qs}^r$ are the voltages in the synchronously rotating reference frame, and L matrix is the observer gains.

The thermal region adaptation is based on a cosine value calculation which enables the thermal adaptation i.e. current reference modification to be executed at above a certain level of cos θ.

In FIG. 5A, a graph of the $i_{ds}^e$ and $i_{qs}^e$ of dq currents of a rotating reference frame are plotted to illustrate an operating region at a higher rotor temperature at 510 and an operating region at a lower rotor temperature at 515. The center of the voltage limit ellipse for the higher rotor temperature at 520 moves to 525 for the lower rotor temperature.

In FIG. 5B, a graph illustrates a decrease and an increase in flux corresponding to various temperatures or determined estimated values of the temperature of the magnetic synchronous motor as well as changes in (or the rotor angular speed. As the angular speed increases, the voltage limit ellipse and the thermal adaptive compensation is applied so that the decrease in flux 535 is reversed to an increase in flux 540. The adaptive thermal compensation is triggered above a threshold level of cos θ. The graph of FIG. 5B illustrates the unit vector direction of the M-axis current of a current compensation which veers in a direction toward a more optimal operating condition, while the unit vector direction of the N-axis current of a current compensation veers in a direction toward a less optimal operating condition as the angular rotor speed increases.

Figure 6:
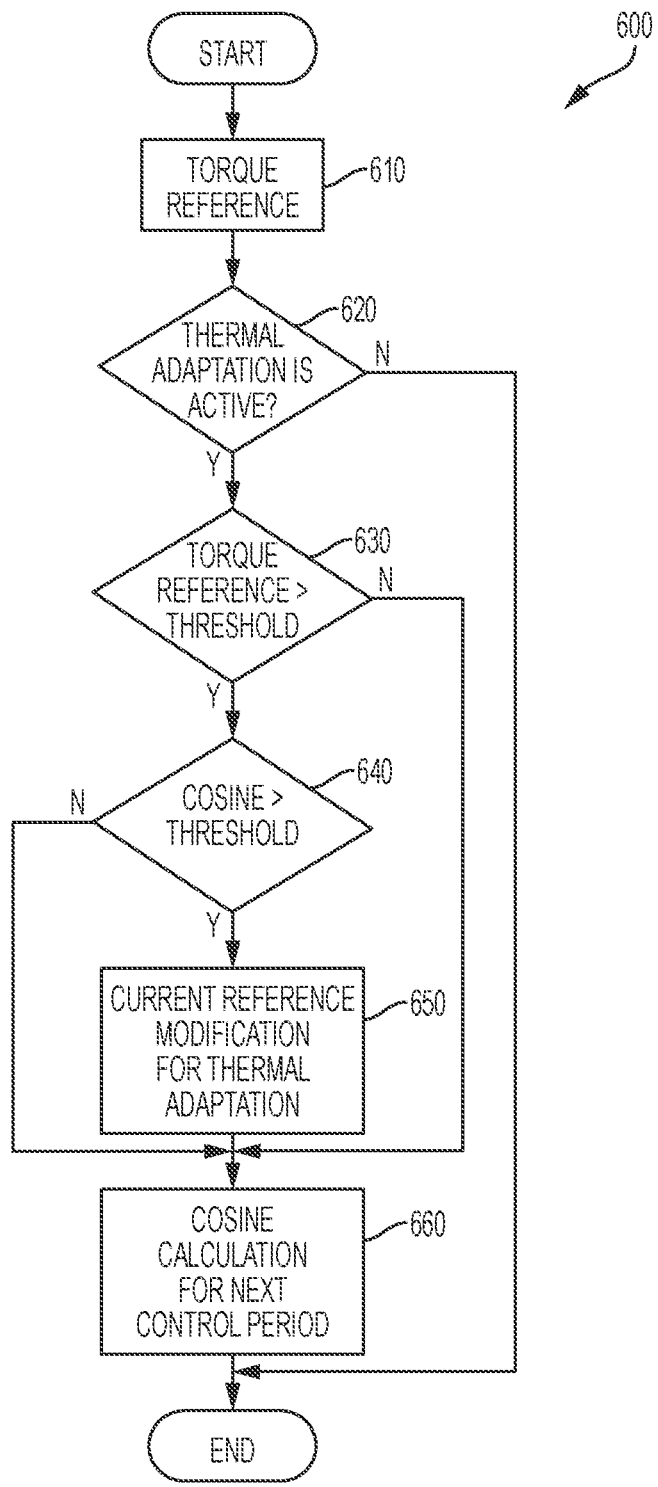
FIG. 6 is a process flow chart depicting an example process of apply the adaptive thermal compensation for rotor control in accordance with an embodiment.

FIG. 6 is a process flow chart depicting an example process of the adaptive thermal compensation for rotor control in accordance with an embodiment. The order of operation within the process is not limited to the sequential execution as illustrated in the figure, but may be performed in one or more varying orders as applicable and in accordance with the present disclosure. In various embodiments, the process can be scheduled to run continuously or not during operation of the vehicle 10.

The flow process is described in relation to block diagram of FIG. 2 and respective components. At 610, an initial torque reference is received at the current command generation module 220 and the current reference modification module 215. At 620, a check of whether the thermal adaptation has been triggered is performed or a check of whether the adaptive thermal compensation is in fact active. At 630, if the thermal adaptation is active, then the torque reference is checked as to whether the current torque reference is greater than a certain threshold level for providing d-axis compensation current. If the torque reference is deemed not to be greater than the threshold level, then the next cos θ is calculated for the next control period at 660. Alternatively, if the torque reference is greater than the threshold level, than the flow proceeds to 640. At 640, the cos θ is checked against another threshold level, and if the cos θ is determined to be greater than the another threshold level, the current reference modification for the thermal adaptation at 650 is applied. That is, the current reference modification module 215 receives inputs of the current temperature of the rotor, the torque reference, output from the current command generation module 220, and calculates the change in d-axis and q-axis currents based on the cos θ. If the cos θ is not greater than the another threshold level at 640, the flow proceeds to 660 to calculate the cos θ for the next control period.

Described herein are techniques for applying adaptive thermal compensation system based on operating regions of the synchronous magnetic motor by monitoring and/or determining an estimated temperature variations and angular velocity of the rotor of the synchronous motor. The apparatus, systems, techniques and articles provide an adaptive thermal compensation system based on determined operating regions of the synchronous magnetic motor which improves the torque control performance.

The apparatus, systems, techniques and articles allow for an online monitoring capability for monitoring directional current vectors and certain torque references for enabling adaptive thermal compensation. Further, the adaptive thermal compensation is based on operating regions determined by calculated cosine values related to torque vectors, voltage limit ellipse vectors, magnetic flux, angular velocity and an estimated value of the temperature of the rotor.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for applying adaptive thermal compensation when operating a rotor of a motor, the method comprising:
    receiving a plurality of parameter data of torque and temperature of the rotor and current and voltage of the motor by a region determination module, the set of parameter data comprises: a reference torque of the rotor, a current measurement of the current of the motor, a measured voltage of the motor, an angular speed measured of the rotor, and an estimated temperature of the rotor;
    calculating, by the region determination module from the set of parameter data, a cosine value to determine a region for applying the adaptive thermal compensation wherein the cosine value is calculated from a constant torque direction vector and a voltage limit eclipse vector derived from a functional relationship of the one or more parameter data;
    applying, by a reference modification module, a modification value to incrementally modify the motor current when the motor is operating within the region determined by the region determination module for the adaptive thermal compensation;
    deriving the constant torque direction vector based on the measured angular speed of the rotor wherein the constant torque direction vector is calculated by a function $$M \triangleq \left( -\frac{\partial T_e}{\partial i_{qs}^e}, \frac{\partial T_e}{\partial i_{ds}^e} \right)$$

wherein $T_e$ is an electromagnetic torque and $i^e_{ds}$ and $i^e_{qs}$ are a d- and q-axis dq current in a synchronously rotating reference frame of the motor;
    deriving the voltage limit eclipse vector based on a d-axis current and a q-axis current of the measurement of the current of the motor wherein the voltage limit eclipse vector by the function $$N \triangleq \left( -\frac{\partial J}{\partial i_{ds}^e}, -\frac{\partial J}{\partial i_{qs}^e} \right)$$

wherein $$J = \frac{1}{2}\left(v_{ds}^{e2} + v_{qs}^{e2}\right), v_{ds}^e \cong -\omega_r \lambda_{qs}^e = -\omega_r L_q i_{qs}^e$$

and $v_{qs}^e \cong \omega_r \lambda_{ds}^e = \omega_r(L_d i_{ds}^e + \lambda_f)$ wherein $\lambda^e_{ds}$ and $\lambda^e_{qs}$ are estimated dq flux linkages in the synchronously rotating reference frame, $\omega_r$ is the rotor angular speed, $i^e_{ds}$ and $i^e_{qs}$ are the d-axis and q-axis dq currents in the synchronously rotating reference frame, $v^e_{ds}$ and $v^e_{qs}$ are voltages in the synchronously rotating reference frame, $L_d$ and $L_q$ are d-axis and q-axis inductances, and L matrix is a gain; and
    calculating the cosine value by calculating the inner product of $$\frac{1}{\|M\|}\left(-\frac{\partial T_e}{\partial i_{qs}^e}, \frac{\delta \partial}{\partial i_{ds}^e}\right) \cdot \frac{1}{\|N\|}\left(-\frac{\partial J}{\partial i_{ds}^e}, -\frac{\partial J}{\partial i_{qs}^e}\right) = 1 * 1 * \cos\theta$$

wherein $T_e$ is an electromagnetic torque calculated by the function $$T_e = \frac{3}{2}\frac{P}{2}((L_d - L_q)i_{ds}^e + \lambda_f)i_{qs}^e$$

wherein $i^e_{ds}$ and $i^e_{qs}$ are the d-axis and the q-axis dq current in the synchronously rotating reference frame of the motor wherein $\|x\|$ is a magnitude of vector and $L_d$ and $L_q$ are d-axis and q-axis inductances.

2. The method of claim 1, further comprising:
    applying a first threshold and second torque threshold for determining the region for thermal adaptation wherein second torque threshold is greater than the first torque threshold wherein a d-axis current compensation is applied when the torque is above the second torque threshold.

3. The method of claim 1, wherein a gradient descent compensation is applied when the torque is between the first torque threshold and the second torque threshold.

4. The method of claim 1, wherein no compensation is applied when the torque is below the first torque threshold.

5. The method of claim 1, wherein the adaptive thermal compensation comprises: a d-axis current compensation, and a gradient descent compensation for achieving an optimal operating point when operating the motor.

6. A system comprising:
an adaptive thermal compensation determination module comprising one or more processors configured by programming instructions encoded on non-transient computer readable media, the adaptive thermal compensation determination module configured to:
receive a plurality of parameter data of torque and temperature of the rotor and current and voltage wherein the set of parameter data comprises: an estimated reference torque of the rotor, a current measurement of the current of the motor, a measured voltage of the motor, an angular speed measured of the rotor, and an estimated temperature of the rotor;
calculate, from the set of parameter data, a cosine value to determine a region for applying the adaptive thermal compensation wherein the cosine value is calculated from a constant torque direction vector and a voltage limit eclipse vector derived from a functional relationship of the one or more parameter data;
apply a modification value to incrementally modify the motor current when the motor is operating within the region determined by the region determination module for the adaptive thermal compensation;
derive the constant torque direction vector based on the measured angular speed of the rotor wherein the constant torque direction vector is calculated by a function $$M \triangleq \left(-\frac{\partial T_e}{\partial i_{qs}^e}, \frac{\partial T_e}{\partial i_{ds}^e}\right)$$

wherein $T_e$ is an electromagnetic torque and $i^e_{ds}$ and $i^e_{qs}$ are a d- and q-axis dq current in a synchronously rotating reference frame of the motor;
derive the voltage limit eclipse vector based on a d-axis current and a q-axis current of the measurement of the current of the motor wherein the voltage limit eclipse vector by the function $$N \triangleq \left(-\frac{\partial J}{\partial i_{ds}^e}, -\frac{\partial J}{\partial i_{qs}^e}\right)$$

wherein $$J = \frac{1}{2}\left(v_{ds}^{e2} + v_{qs}^{e2}\right), v_{ds}^e \cong -\omega_r \lambda_{qs}^e = -\omega_r L_q i_{qs}^e$$

and $v_{qs}^e \cong \omega_r \lambda_{ds}^e = \omega_r(L_d i_{ds}^e + \lambda_f)$ wherein $\lambda^e_{ds}$ and $\lambda^e_{qs}$ are estimated dq flux linkages in the synchronously rotating reference frame, $\omega_r$ is the rotor angular speed, $i^e_{ds}$ and $i^e_{qs}$ are the d-axis and q-axis dq currents in the synchronously rotating reference frame, $v^e_{ds}$ and $v^e_{qs}$ are voltages in the synchronously rotating reference frame, $L_d$ and $L_q$ are d-axis and q-axis inductances, and L matrix is a gain; and
calculate the cosine value by calculating the inner product of $$\frac{1}{\|M\|}\left(-\frac{\partial T_e}{\partial i_{qs}^e}, \frac{\delta\partial}{\partial i_{ds}^e}\right) \cdot \frac{1}{\|N\|}\left(-\frac{\partial J}{\partial i_{ds}^e}, -\frac{\partial J}{\partial i_{qs}^e}\right) = 1 * 1 * \cos\theta$$

wherein $T_e$ is an electromagnetic torque calculated by the function $$T_e = \frac{3}{2}\frac{P}{2}((L_d - L_q)i_{ds}^e + \lambda_f)i_{qs}^e$$

wherein $i^e_{ds}$ and $i^e_{qs}$ are the d-axis and the q-axis dq current in the synchronously rotating reference frame of the motor wherein $\|x\|$ is a magnitude of vector and $L_d$ and $L_q$ are d-axis and q-axis inductances.

7. The system of claim 6, wherein the adaptive thermal compensation determination module is configured to:
derive the constant torque direction vector based on a measured or an estimated angular speed of the rotor.

8. The system of claim 7, wherein the adaptive thermal compensation determination module is configured to:
apply a first threshold and second torque threshold for determining the region for thermal adaptation wherein second torque threshold is greater than the first torque threshold wherein a d-axis current compensation is applied when the torque is above the second torque threshold.

9. The system of claim 8, wherein the adaptive thermal compensation determination module is configured to:
apply a gradient descent compensation when the torque is between the first torque threshold and the second torque threshold.

10. The system of claim 8, wherein the adaptive thermal compensation determination module is configured to:
apply no compensation when the torque is below the first torque threshold.

11. The system of claim 6, wherein the adaptive thermal compensation determination module is configured to:
derive the voltage limit eclipse vector based on a d-axis and a q-axis of the measurement of the current of the motor.

12. The system of claim 6, wherein the adaptive thermal compensation determination module is configured in submodules of a region determination module and a reference modification module.

13. The system of claim 6, wherein the adaptive thermal compensation comprises: a d-axis current compensation, and a gradient descent compensation for achieving an optimal operating point when operating the motor.

14. A vehicle, comprising an electric permanent magnet motor and a region determination module comprising one or more processors and non-transient computer readable media encoded with programming instructions, the region determination module is configured to:
receive a plurality of parameter data of torque and temperature of the rotor and current and voltage wherein the set of parameter data comprises: a reference torque of the rotor, a current measurement of the current of the motor, a measured voltage of the motor, an angular speed measured of the rotor, and an estimated temperature of the rotor;
calculate, from the set of parameter data, a cosine value to determine a region for applying adaptive thermal compensation wherein the cosine value is calculated from a constant torque direction vector and a voltage limit eclipse vector derived from a functional relationship of the one or more parameter data;
apply a modification value to incrementally modify the motor current when the motor is operating within the region determined by the region determination module for the adaptive thermal compensation;

derive the constant torque direction vector based on the measured angular speed of the rotor wherein the constant torque direction vector is calculated by a function $$M \triangleq \left( -\frac{\partial T_e}{\partial i_{qs}^e}, \frac{\partial T_e}{\partial i_{ds}^e} \right)$$

wherein $T_e$ is an electromagnetic torque and $i^e_{ds}$ and $i^e_{qs}$ are a d- and q-axis dq current in a synchronously rotating reference frame of the motor;

derive the voltage limit eclipse vector based on a d-axis current and a q-axis current of the measurement of the current of the motor wherein the voltage limit eclipse vector by the function $$N \triangleq \left( -\frac{\partial J}{\partial i_{ds}^e}, -\frac{\partial J}{\partial i_{qs}^e} \right)$$

wherein $$J = \frac{1}{2}\left( v_{ds}^{e2} + v_{qs}^{e2} \right), v_{ds}^e \cong -\omega_r \lambda_{qs}^e = -\omega_r L_q i_{qs}^e$$

and $v_{qs}^e \cong \omega_r \lambda_{ds}^e = \omega_r (L_d i_{ds}^e + \lambda_f)$ wherein $\lambda^e_{ds}$ and $\lambda^e_{qs}$ are estimated dq flux linkages in the synchronously rotating reference frame, $\omega_r$ is the rotor angular speed, $i^e_{ds}$ and $i^e_{qs}$ are the d-axis and q-axis dq currents in the synchronously rotating reference frame, $v^e_{ds}$ and $v^e_{qs}$ are voltages in the synchronously rotating reference frame, $L_d$ and $L_q$ are d-axis and q-axis inductances, and L matrix is a gain; and calculate the cosine value by calculating the inner product of $$\frac{1}{\|M\|}\left( -\frac{\partial T_e}{\partial i_{qs}^e}, \frac{\delta \partial}{\partial i_{ds}^e} \right) \cdot \frac{1}{\|N\|}\left( -\frac{\partial J}{\partial i_{ds}^e}, -\frac{\partial J}{\partial i_{qs}^e} \right) = 1*1*\cos\theta$$

wherein $T_e$ is an electromagnetic torque calculated by the function $$T_e = \frac{3}{2}\frac{P}{2}((L_d - L_q)i_{ds}^e + \lambda_f)i_{qs}^e$$

wherein $i^e_{ds}$ and $i^e_{qs}$ are the d-axis and the q-axis dq current in the synchronously rotating reference frame of the motor wherein ‖x‖ is a magnitude of vector and $L_d$ and $L_q$ are d-axis and q-axis inductances.

15. The vehicle of claim 14, wherein the adaptive thermal compensation comprises: a d-axis current compensation, and a gradient descent compensation for achieving an optimal operating point when operating the motor.

16. The vehicle of claim 14, wherein the region determination module is configured in sub-modules of a determination module and a reference modification module.

* * * * *